United States Patent
Cramblitt

(10) Patent No.: US 11,900,633 B2
(45) Date of Patent: Feb. 13, 2024

(54) VEHICLE POSE DETERMINATION SYSTEMS AND METHODS

(71) Applicant: THE BOEING COMPANY, Chicago, IL (US)

(72) Inventor: Robert M. Cramblitt, Hazelwood, MO (US)

(73) Assignee: The Boeing Company, Chicago, IL (US)

(*) Notice: Subject to any disclaimer, the term of this patent is extended or adjusted under 35 U.S.C. 154(b) by 45 days.

(21) Appl. No.: 17/543,780

(22) Filed: Dec. 7, 2021

(65) Prior Publication Data

US 2022/0237822 A1 Jul. 28, 2022

Related U.S. Application Data

(60) Provisional application No. 63/142,008, filed on Jan. 27, 2021.

(51) Int. Cl.
*G06T 7/73* (2017.01)
*G06T 7/32* (2017.01)
*B64D 47/08* (2006.01)
*G06F 16/51* (2019.01)
*H04N 7/18* (2006.01)

(52) U.S. Cl.
CPC ............ *G06T 7/75* (2017.01); *B64D 47/08* (2013.01); *G06F 16/51* (2019.01); *G06T 7/32* (2017.01); *H04N 7/18* (2013.01); *G06T 2207/10032* (2013.01)

(58) Field of Classification Search
None
See application file for complete search history.

(56) References Cited

U.S. PATENT DOCUMENTS

| | | | |
|---|---|---|---|
| 4,133,004 A | 1/1979 | Fitts | |
| 4,849,906 A * | 7/1989 | Chodos | G01S 3/7865 382/103 |
| 5,809,171 A | 9/1998 | Neff | |
| 5,946,422 A | 8/1999 | Neff | |
| 5,982,930 A | 11/1999 | Neff | |
| 5,982,945 A | 11/1999 | Neff | |
| 10,882,635 B2 | 1/2021 | Cramblitt | |
| 11,055,875 B2 | 7/2021 | Cramblitt | |
| 2018/0260793 A1* | 9/2018 | Li | G06Q 40/08 |
| 2021/0104162 A1* | 4/2021 | Nykl | G08G 5/0008 |

OTHER PUBLICATIONS

William J. Hughes Technical Center WAAS T&E Team, "Global Positioning System (GPS) Standard Positioning Service (SPS) Performance Analysis Report," Federal Aviation Administration, Washington, 2017.

* cited by examiner

*Primary Examiner* — Heather R Jones
(74) *Attorney, Agent, or Firm* — Joseph M. Butscher; The Small Patent Law Group LLC

(57) ABSTRACT

A system and a method include an imaging device configured to capture one or more images of a first vehicle. A control unit is in communication with the imaging device. A model database is in communication with the control unit. The model database stores a three-dimensional (3D) model of the first vehicle. The control unit is configured to receive image data regarding the one or more images of the first vehicle from the imaging device and analyze the image data with respect to the 3D model of the first vehicle to determine a pose of the first vehicle.

20 Claims, 4 Drawing Sheets

VEHICLE POSE DETERMINATION SYSTEMS AND METHODS

CROSS-REFERENCE TO RELATED APPLICATIONS

This application relates to and claims priority benefits from U.S. Provisional Patent Application No. 63/142,008, entitled "Vehicle Pose Determination Systems and Methods," filed Jan. 27, 2021, which is hereby incorporated by reference in its entirety.

FIELD OF THE DISCLOSURE

Embodiments of the present disclosure generally relate to vehicle pose determination systems and methods, such as may be used with aircraft during an in-flight refueling or rendezvous process.

BACKGROUND OF THE DISCLOSURE

During a flight, an aircraft may need to be refueled. Certain aircraft are configured as fuel tankers that are configured to refuel another aircraft during a flight. For example, a fuel tanker may include a boom or drogue that is extended behind the fuel tanker during a flight. The boom is coupled to a fuel line. A trailing aircraft is maneuvered to the end of the boom, which is then attached to a fuel inlet of a probe of the trailing aircraft. After the boom of the fuel tanker is connected to the fuel inlet of the trailing aircraft, an in-flight refueling of the trailing aircraft occurs.

Typically, a pilot of the trailing aircraft maneuvers the trailing aircraft in relation to the fuel tanker. The pilot manually operates the control devices of the trailing aircraft to guide the probe to the boom (engagement), and ensure a connection therebetween. Once the fuel inlet is connected to the boom, the pilot continues to manually operate the control devices of the trailing aircraft to ensure that the fuel inlet remains coupled to the boom as the trailing aircraft is refueled. Typically, as the trailing aircraft is being refueled, the pilot ensures that the trailing aircraft maintains position in relation to the fuel tanker, which is known as station-keeping. Station-keeping also occurs while the trailing aircraft is queuing to be refueled, and various forms of formation flight. After the refueling process, the connection between the probe of the trailing aircraft is disconnected from the boom of the fuel tanker (disengagement), and the refueled aircraft continues flight, such as according to a particular mission.

As can be appreciated, the process of maneuvering a trailing aircraft in relation to the fuel tanker, and manually controlling the trailing aircraft (as well as the boom of the fuel tanker) during the refueling process requires a high level of skill and experience. In certain situations, such as during periods of turbulence, a pilot may have difficulty maneuvering the trailing aircraft in relation to the fuel tanker before and after the connection between the boom and the fuel inlet is attained (engagement and disengagement). Further, the advent of autonomous aircraft without human pilots typically utilizes fully autonomous maneuvering.

SUMMARY OF THE DISCLOSURE

A need exists for a system and a method for automatically determining a pose of a first vehicle relative to a second vehicle. Also, a need exists for a system and a method for automatically controlling positioning (including position/location and/or orientation) of a vehicle, such an aircraft during an in-flight refueling process. Further, a need exists for a system and a method for automatically maintaining a relative position between two different vehicles. Moreover, a need exists for a low cost, effective, and efficient automatic vehicle pose determination and positioning.

With those needs in mind, certain embodiments of the present disclosure provide a system including an imaging device configured to capture one or more images of a first vehicle. A control unit is in communication with the imaging device. A model database is in communication with the control unit. The model database stores a three-dimensional (3D) model of the first vehicle. The control unit is configured to receive image data regarding the one or more images of the first vehicle from the imaging device and analyze the image data with respect to the 3D model of the first vehicle to determine a pose of the first vehicle.

In at least one embodiment, the system also includes a second vehicle. For example, the second vehicle includes the imaging device, the control unit, and the model database.

As an example, the first vehicle is a first aircraft and the second vehicle is a second aircraft. As a further example, the second vehicle trails the first vehicle. As another example, the first vehicle trails the second vehicle.

In at least one embodiment, the second vehicle further includes one or more control devices in communication with the control unit. The control unit is configured to operate the one or more control devices based on the pose of the first vehicle.

In at least one embodiment, the control unit is configured to move and manipulate the 3D model of the first vehicle to match the image data of the first vehicle and determine the pose of the first vehicle.

As an example, the control unit includes a renderer that dynamically generates an expected image as anticipated to be captured by the imaging device.

As an example, the control unit is configured to employ Maximum Mutual Information Correlator (MMIC) matching followed by a Fitts correlator.

Certain embodiments of the present disclosure provide a method including capturing, by an imaging device, one or more images of a first vehicle; storing, in a model database, a three-dimensional (3D) model of the first vehicle; communicatively coupling a control unit with the imaging device; communicatively coupling the model database with the control unit; receiving, by the control unit, image data regarding the one or more images of the first vehicle from the imaging device; and analyzing, by the control unit, the image data with respect to the 3D model of the first vehicle to determine a pose of the first vehicle.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Certain embodiments of the present disclosure provide vehicle pose determination systems and methods that use computer vision to measure a relative pose between two vehicles, such as two aircraft. Embodiments of the present disclosure can be used to facilitate rendezvous, station-keeping and/or docking, such as between two aircraft. The systems and methods provide vision-based guidance and alignment using one or more imaging devices. The systems and methods provide true three-dimensional (3D) tracking of relative pose, rather than simple two-dimensional tracking of position. Further, the systems and methods provide a passive measurement approach, which operate independently of other infrastructure. In at least one embodiment, the systems and methods estimate relative pose (attitude and position) between two vehicles using passive computer vision techniques, such as to allow for rendezvous and station-keeping between the vehicles.

Embodiments of the present disclosure provide systems and methods that are configured to calculate a relative position and attitude (pose) between two vehicles, such as aircraft, to support autonomous operations that will allow the vehicles to rendezvous, maintain relative position (station-keeping), transfer fuel and cargo, and/or the like. In at least one embodiment, the term pose relates to a six degree of freedom vector of position (x, y, z) and angular orientation (yaw, pitch, roll).

The term "pose" refers to the six-degree of freedom position and attitude of an object, such as a first vehicle, with respect to a second object, such as a second vehicle.

Figure 1:
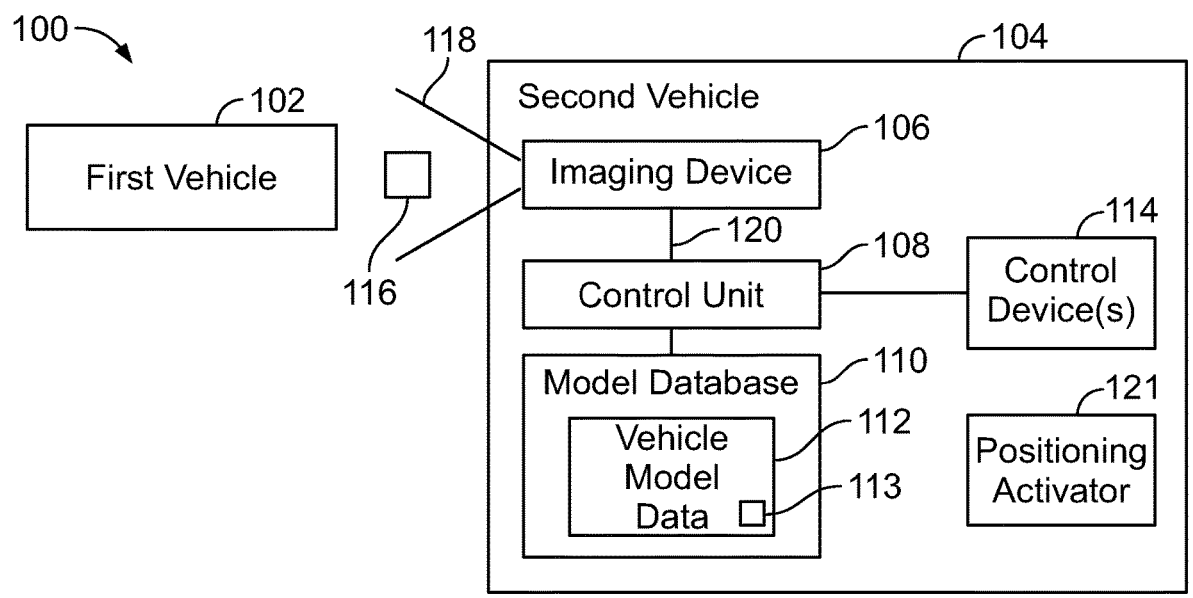
FIG. 1 illustrates a schematic block diagram of a system for determining a pose of a first vehicle in relation to a second vehicle, according to an embodiment of the present disclosure.

FIG. 1 illustrates a schematic block diagram of a system 100 for determining a pose of a first vehicle 102 in relation to a second vehicle 104, according to an embodiment of the present disclosure. In at least one embodiment, the first vehicle 102 is a first aircraft and the second vehicle 104 is a second aircraft. In at least one embodiment, the first aircraft 102 leads (for example, in front) the second aircraft 104, which trails (that is, behind) that first aircraft 102. Optionally, the first aircraft 102 trails the second aircraft 104. In at least one other embodiment, the first vehicle 102 and/or the second vehicle 104 is a ground based vehicle, such as an automobile, bus, locomotive, military vehicle (such as a tank), and/or the like. In at least one embodiment, the first vehicle 102 and/or the second vehicle 104 is a spacecraft, watercraft, or the like. In at least one embodiment, the first vehicle 102 is an aeronautical or aerospace vehicle, and the second vehicle 104 is a land-based or water-based vehicle.

In at least one embodiment, the first vehicle 102 is a fuel tanker, such as a KC-46, manufactured by The Boeing Company, and the second vehicle 104 is a military fighter jet, such as an F-15, manufactured by The Boeing Company. Optionally, as another example, the first vehicle 102 is a military fighter jet, and the second vehicle 104 is a fuel tanker. As another example, one or both of the first vehicle 102 or the second vehicle 104 is/are an unmanned aircraft, such as an unmanned aerial vehicle, drone, or the like.

The second vehicle 104 includes an imaging device 106 in communication with a control unit 108, such as through one or more wired or wireless connections. The control unit 108 is further in communication with a model database 110, such as through one or more wired or wireless connections. The model database 110 stores vehicle model data 112 related to one or more vehicle models, such as computer aided design (CAD) models of the first vehicle 102 and/or the second vehicle 104.

In at least one embodiment, the control unit 108 is further in communication with one or more control devices 114 of the second vehicle 104, such as through one or more wired or wireless connections. The control devices 114 are operatively coupled to various components of the second vehicle 104, such as engines, control surfaces on wings, stabilizers, etc., and the like. The control devices 114 can include one or more of a yoke, stick, joystick, pedals, buttons, switches, keyboards, touchscreens, and/or the like that are configured to control the various components of the second vehicle 104. The control devices 114 can be onboard the second vehicle 104 (such as within a cockpit or flight deck), or remotely located from the second vehicle 104, such as if the second vehicle 104 is an unmanned aerial vehicle. Optionally, the control unit 108 is not in communication with the control device(s) 114. Optionally, the first vehicle 102 includes the imaging device 106, the control unit 108, the model database 110, and/or the control device(s) 114. For example, the first vehicle 102 can be a tanker aircraft that maneuvers a boom to engage the second vehicle 104, such as an aircraft that is to be refueled. The imaging operations described herein can be used to automatically operate and guide the tanker in relation to the other aircraft to couple the boom to the other aircraft for refueling. Certain embodiments of the present disclosure provide a system that is configured to determine relative pose between two different aircraft to facilitate station-keeping and maintain safe zones.

In at least one embodiment, the imaging device 106 is a camera, such as a video camera, still image camera, and/or the like. As another example, the imaging device 106 is an infrared imaging device. As another example, the imaging device 106 is an ultrasonic imaging device. As another example, the image device 106 is a Laser Detection and Ranging (LADAR) sensor. As another example, the imaging device 106 is a radio detection and ranging (RADAR) sensor. The imaging device 106 is configured to capture one or more images 116 of the first vehicle 102 within a field of view 118. In at least one embodiment, one or more imaging devices 106 are configured to utilize multiple image bands in order to extend the envelope of operational conditions to exploit the viewing benefits of each band.

As an example, and as shown on FIG. 1, the second vehicle 104 is a trailing aircraft that is to be refueled in flight by the first vehicle 102, such as a tanker aircraft. The second vehicle 104 includes the imaging device 106, the control unit 108, the model database 110, the control devices 114, and the positioning activator 121, as shown in FIG. 1. Continuing with this example, in operation, the imaging device 106 of the second vehicle 104 images the first vehicle 102 and acquires the one or more images 116 of the first vehicle 102. The imaging device 106 outputs image data 120, which can include raw image data and/or reconstructed images 116 to the control unit 108.

The control unit 108 analyzes the image data 120 in relation to the vehicle model data 112, which includes a 3D model 113 of the first vehicle 102. In particular, the control unit 108 compares the image data 120 to the vehicle model data 112. The control unit 108 moves and manipulates (for example, virtually moves and manipulates) the 3D model 113 of the first vehicle 102, as stored in the vehicle model data 112, to match the image data 120 of the first vehicle 102. When the image data 120 matches the 3D model 113, the control unit 108 determines the pose of the first vehicle 102 relative to the second vehicle 104. In this manner, the control unit 108 determines the pose (including position and angular orientation) of the first vehicle 102 relative to the second vehicle 104.

In at least one embodiment, the control unit 108 automatically operates the second vehicle 104 based on the determined pose of the first vehicle 102 relative to the second vehicle 104. For example, the control unit 108 operates the control devices 114 of the second vehicle 104 to automatically control the second vehicle 104 relative to the first vehicle 102. In particular, by determining the pose of the first vehicle 102 relative to the second vehicle 104, the control unit 108, such as when commanded by a pilot or operator (such as a land-based operator on an unmanned aerial vehicle), automatically operates the control device 114 of the second vehicle 104 to maintain a predetermined distance and orientation between the first vehicle 102 and the second vehicle 104.

In at least one embodiment, the second vehicle 104 includes a positioning activator 121 in communication with the control unit 108, such as through one or more wired or wireless connections. The second vehicle 104 can be activated into an automatic positioning mode by the positioning activator 121. For example, before and/or during a refueling process, a pilot may engage the positioning activator 121 to allow the control unit 108 to automatically control and position the second vehicle 104 relative to the first vehicle 102. In general, the positioning activator 121 is configured to be selectively engaged to selectively transition the second vehicle 104 between a manual control mode (in which a pilot controls operation of the second vehicle 104) to the automatic positioning mode (in which the control unit 108 automatically controls the second vehicle 104 based on the determined pose of the first vehicle 102 relative to the second vehicle 104, as described herein). In at least one embodiment, determination of the pose allows the control unit 108 to operate the second vehicle 104. As another example, the automatic positioning mode may occur when the first vehicle 102 and the second vehicle 104 are on the ground (or in the air) to ensure that the first vehicle 102 and the second vehicle 104 remain a predetermined distance from one another, such as to avoid collisions or other inadvertent encounters. In at least one embodiment, the control unit 108 operates the control devices 114 to automatically maneuver the second vehicle 104 in relation to the first vehicle 102 to connect a fuel inlet of a probe of the second vehicle 104 to a boom of the first vehicle 102, which may be a fuel tanker, for example.

Optionally, the second vehicle 104 may not include the positioning activator 121. Instead, the second vehicle 104 may automatically transition to the automatic positioning mode, such as when the first vehicle 102 is determined to be within a predetermined distance (such as within 500 meters or less) of the second vehicle 104, such as determined by the control unit 108 determining the pose of the first vehicle 102 relative to the second vehicle 104. In at least one embodiment, the second vehicle 104 includes a manual override mechanism (such as a physical or virtual button, lever, switch, key, slide, or the like) that allows a pilot to manually override the automatic positioning mode.

As described herein, the system 100 includes the imaging device 106, which is configured to capture one or more images 116 of the first vehicle 102. The control unit 108 is in communication with the imaging device 106. The model database 110 is in communication with the control unit 108. The model database 110 stores the 3D model 113 of the first vehicle 102. The control unit 108 is configured to receive the image data 120 regarding the one or more images 116 of the first vehicle 102 from the imaging device 106 and analyze the image data 120 with respect to the 3D model 113 of the first vehicle 102 to determine a pose of the first vehicle 102, such as in relation to the second vehicle 104.

In at least one embodiment, the second vehicle 104 includes the imaging device 106, the control unit 108, and the model database 110. In at least one other embodiment, another component can include one or more of the imaging device 106, the control unit 108, and the model database 110. For example, a land based monitoring station, a satellite, a different vehicle, or the like can include one or more of the imaging device 106, the control unit 108, and/or the model database 110. As an example, the imaging device 106 on a satellite or land-based structure can be used to determine a pose of an approaching aircraft, spacecraft, or the like.

As used herein, the term "control unit," "central processing unit," "unit," "CPU," "computer," or the like can include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 108 can be or include one or more processors that are configured to control operation thereof, as described herein.

The control unit 108 is configured to execute a set of instructions that are stored in one or more data storage units or elements (such as one or more memories), in order to process data. For example, the control unit 108 can include or be coupled to one or more memories. The data storage units can also store data or other information as desired or needed. The data storage units can be in the form of an information source or a physical memory element within a processing machine. The one or more data storage units or elements can comprise volatile memory or nonvolatile memory, or can include both volatile and nonvolatile memory. As an example, the nonvolatile memory can comprise read only memory (ROM), programmable ROM (PROM), electrically programmable ROM (EPROM), electrically erasable PROM (EEPROM), and/or flash memory and volatile memory can include random access memory (RAM), which can act as external cache memory. The data stores of the disclosed systems and methods is intended to comprise, without being limited to, these and any other suitable types of memory.

The set of instructions can include various commands that instruct the control unit 108 as a processing machine to perform specific operations such as the methods and processes of the various embodiments of the subject matter described herein. The set of instructions can be in the form of a software program. The software can be in various forms such as system software or application software. Further, the software can be in the form of a collection of separate programs, a program subset within a larger program or a portion of a program. The software can also include modular programming in the form of object-oriented programming. The processing of input data by the processing machine can be in response to user commands, or in response to results of previous processing, or in response to a request made by another processing machine.

The diagrams of embodiments herein illustrate one or more control or processing units, such as the control unit 108. It is to be understood that the processing or control units can represent circuits, circuitry, or portions thereof that can be implemented as hardware with associated instructions (e.g., software stored on a tangible and non-transitory computer readable storage medium, such as a computer hard drive, ROM, RAM, or the like) that perform the operations described herein. The hardware can include state machine circuitry hardwired to perform the functions described herein. Optionally, the hardware can include electronic circuits that include and/or are connected to one or more logic-based devices, such as microprocessors, processors, controllers, or the like. Optionally, the control unit 108 can represent processing circuitry such as one or more of a field programmable gate array (FPGA), application specific integrated circuit (ASIC), microprocessor(s), and/or the like. The circuits in various embodiments can be configured to execute one or more algorithms to perform functions described herein. The one or more algorithms can include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

In at least one embodiment, components of the system 100, such as the control unit 108, provide and/or enable a computer system to operate as a special computer system for automatic pose determination and/or positioning processes.

Figure 2:
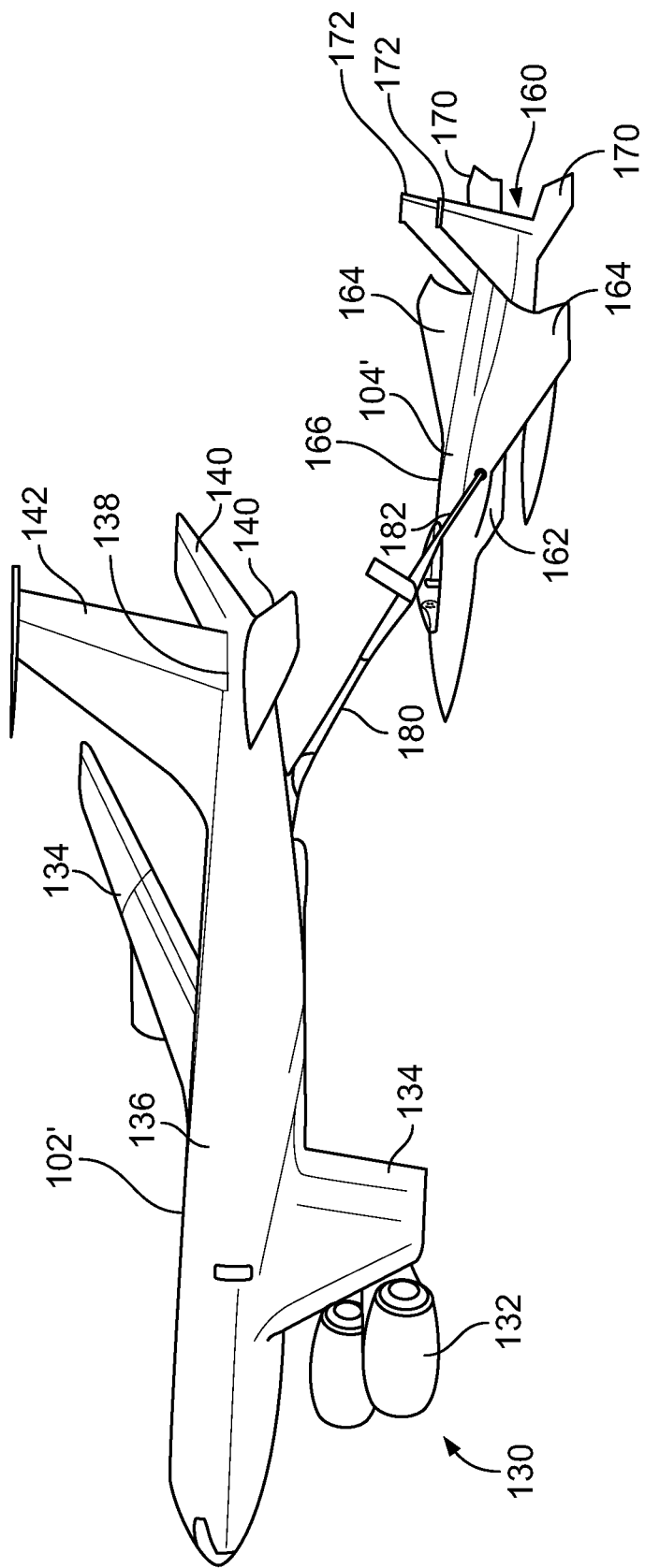
FIG. 2 illustrates a perspective view of a first aircraft refueling a second aircraft, according to an embodiment of the present disclosure.

FIG. 2 illustrates a perspective view of a first aircraft 102' refueling a second aircraft 104', according to an embodiment of the present disclosure. The first aircraft 102' is an example of the first vehicle 102 (shown in FIG. 1), and the second aircraft 104' is an example of the second vehicle 104 (also shown in FIG. 1). The first aircraft 102' includes a propulsion system 130 that includes one or more engines 132, for example. The engines 132 are carried by wings 134 of the first aircraft 102'. In other embodiments, the engines 132 may be carried by a fuselage 136 and/or an empennage 138. The empennage 138 may also support horizontal stabilizers 140 and a vertical stabilizer 142. The second aircraft 104' includes a propulsion system 160 that may include one or more engines 162, for example. The engines 162 are carried by wings 164 and/or a fuselage 166 of the second aircraft 104'. In other embodiments, the engines 162 may be carried by the fuselage 166 and/or an empennage, which may also support horizontal stabilizers 170 and vertical stabilizers 172. In at least one embodiment, the first aircraft 102' is a fuel tanker that extends a boom 180 having a fuel line. The second aircraft 104' includes a probe 182 having a fuel inlet.

Referring to FIGS. 1 and 2, embodiments of the present disclosure provide systems and methods for automatic station-keeping of the second aircraft 104' during in-flight refueling. Further, the imaging device 106 and the model database 110 provide low-cost components that can be quickly and easily added to the second aircraft 104', in contrast to more expensive and complex light detection and ranging (LIDAR) systems, laser-based systems, or the like. Accordingly, embodiments of the present disclosure provide low-cost and effective systems and methods for automatically determining a pose of the first aircraft 102' relative to the second aircraft 104' (or vice versa), and optionally controlling the second aircraft 104' relative to the first aircraft 102' (or vice versa). The first aircraft 102' and the second aircraft 104' may be manufactured having the components described herein, or existing aircraft can be quickly and easily retrofit at a relatively low cost.

Figure 3:
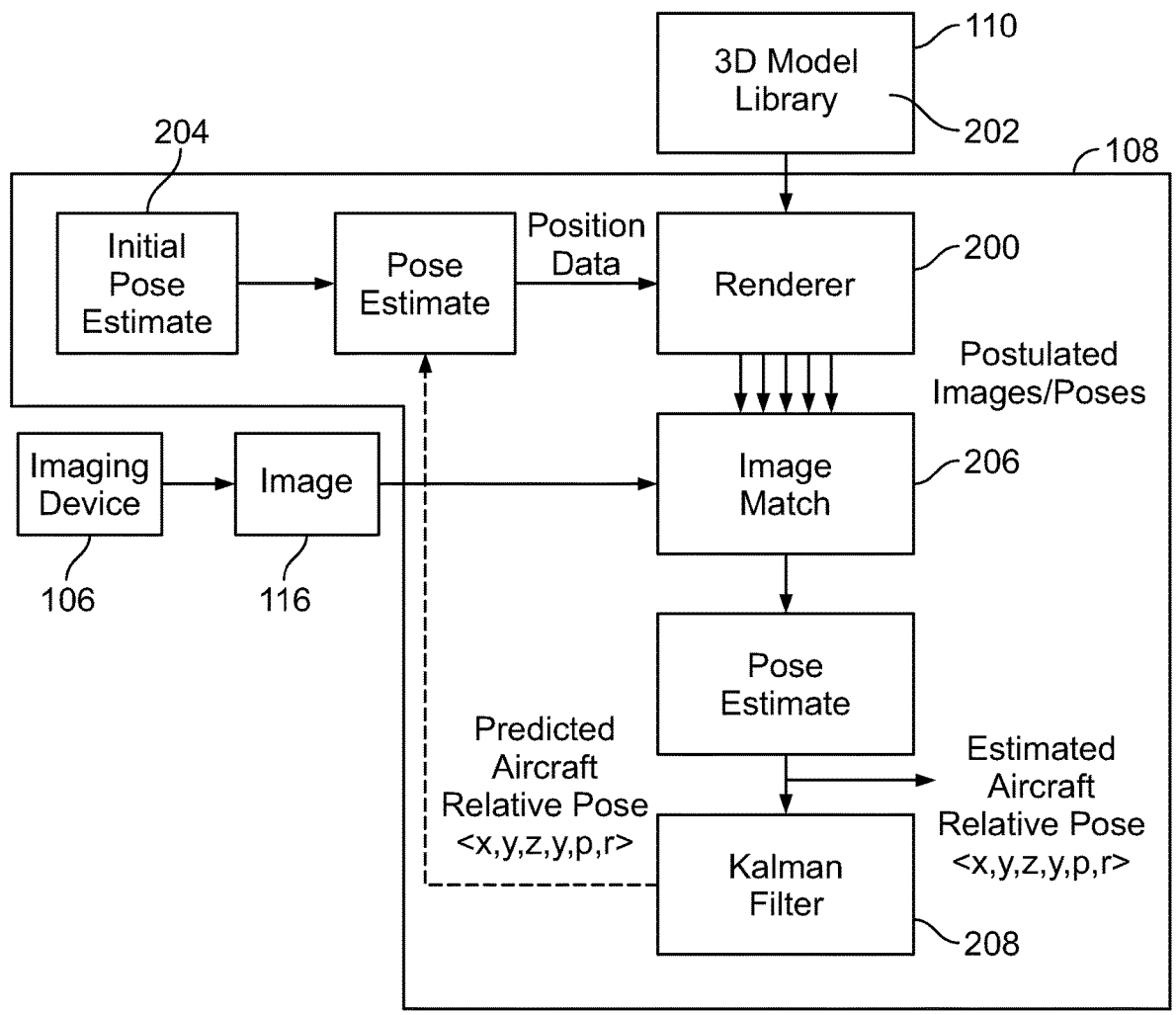
FIG. 3 illustrates a schematic block diagram for architecture of the system of FIG. 1, according to an embodiment of the present disclosure.

FIG. 3 illustrates a schematic block diagram for architecture of the system of FIG. 1, according to an embodiment of the present disclosure. Referring to FIGS. 1 and 3, in at least one embodiment, the system 100 analyzes the 3D model 113 of the first vehicle 102, such as with respect to a synthetic or virtual viewpoint. Positions of one or more components of the first vehicle 102 are determined through one or more images 116, as captured by the imaging device 106. In at least one embodiment, the control unit 108 renders portions of a 3D terrain database, rather than 3D object models, at various possible poses, which are then compared to actual measurements (such as the image(s) 116) to determine a pose of the first vehicle 102 relative to the second vehicle 104 or even a surrounding setting, such as a runway. The systems and methods described herein can be used to implement station-keeping with respect to ground or maritime vehicles and/or objects, for example, in addition to aerial vehicles.

In at least one embodiment, the orientation and position of the imaging device(s) 106 with respect to a reference location on the second vehicle 104 is assumed to be known. Notably, the vehicle model data 112 is locally stored within the model database 110, such as may be or include a 3-D model library 202, which includes models of vehicles expected to be engaged. In at least one embodiment, the control unit 108 includes a renderer 200, which dynamically generates an expected image as anticipated to be captured by the imaging device 106. The renderer 200 is configured to render the expected image from an arbitrary point of view, and arbitrary relative pose.

The renderer 200 of the control unit 108 renders views of the observed vehicle type from the 3D model library 202 (such as that of the model database 110) with a perspective. The renderer 200 generates a number of images, each corresponding to a particular relative pose, all of which are compared to the actual image 116 captured by the imaging device 106. As an example, each expected image corresponds to a different postulated relative pose.

The type of aircraft in the field of view 118 of the imaging device 106 is assumed to be known. An initial pose estimate 204, based on either image measurements or a priori probabilities, is used to set a nominal pose used by the renderer 200. The renderer 200 then generates a view of the 3D model 113 of the first vehicle 102 (or portions thereof, such as when the first vehicle 102 is close enough to the second vehicle 104 in which at least portions of the first vehicle 102 are outside the field of view 118) at multiple pose values bracketing the nominal value.

Because the renderer 200 operates on the 3D model 113, the renderer 200 is able to acquire views at any pose value. Each of the resulting rendered images is compared to the actual image (that is, the image 116) in an image match block 206. Resulting match statistics are processed to select a best estimate of relative pose among tested values.

In at least one embodiment, the control unit 108 employs a Maximum Mutual Information Correlator (MMIC) matching (or registration) algorithm to make the comparisons and determine a best match. The relative viewing geometry that defines the selected match is then accepted as an estimate of the relative pose of the first vehicle 102 relative to the second vehicle 104. In at least one embodiment, the control unit 108 achieves sub-pixel registration accuracy by following this step with a Fitts correlator, for example.

Once the first pose estimate is determined, further iterations allow the solution to become more precise as the distance between the first vehicle 102 and the second vehicle 104 decreases, and the diversity of rendered images can be restricted to reduce computational burdens. After at least two measurements, a predictive tracking filter, such as a Kalman filter 208, can be used to predict the expected location of the first vehicle 102 in the next image frame, and the expected pose is updated to adjust the rendering engine accordingly.

In at least one embodiment, when the first vehicle 102 being imaged by the imaging device 106 occupies only a portion of a camera frame, for example, the renderer 200 can be configured to generate multiple renderings of the entire vehicle as an input to the matching process. The pose of the rendered image that has the best match score can be selected as the best estimate of relative pose among the values tested.

As the same vehicle moves closer, the renderer 200 can render and match a multitude of smaller image sections for each pose value, each containing sufficient information (such as predetermined and known features) to support a match computation. Such a process may be used when the range between the first vehicle 102 and the second vehicle 104 is relatively small (such as within 30 meters or less) and the first vehicle 102 occupies a large portion of the image 116. In this case, algorithms can be applied to estimate relative pose using the locations of feature matches in the image plus the knowledge of how the feature points are geometrically related in 3D.

In at least one embodiment, the MMIC algorithm is sensitive to the information content in the scene to be matched, rather than a particular ordering of gray levels or colors. Hence, the control unit 108 can employ the MMIC algorithm to match scenes from an arbitrary model database to the output of various imaging sensors (for example, monochrome or color visible, MWIR, LWIR, SWIR, RADAR and LADAR).

As described herein, the control unit 108 is configured to dynamically generate scenes with respect to the first vehicle 102. For example, the renderer 200 generates reference images in real-time with arbitrary pose values (such as through manipulation of the 3D model 113), in contrast to the use of rigid, pre-computed image libraries. Optionally and/or additionally, the renderer 200 generates reference images from and/or in relation to pre-computed, fixed pose data. In at least one embodiment, the control unit 108 uses the MMIC, instead of traditional correlators, to match images or features, combined with use of a Fitts correlator for sub-pixel registration accuracy. Further, in at least one embodiment, the control unit 108 uses the MMIC algorithm to match multiple object images and then infer pose. Additionally, in at least one embodiment, the control unit 108 uses the MMIC algorithm to match predetermined object feature points which are then used with a pose estimation algorithm.

Embodiments of the present disclosure are able to track a relative pose of the first vehicle 102 in six degrees of freedom. That is, the control unit 108 is configured to track position and attitude of the first vehicle 102, in contrast to basis two-dimensional tracking.

Figure 4:
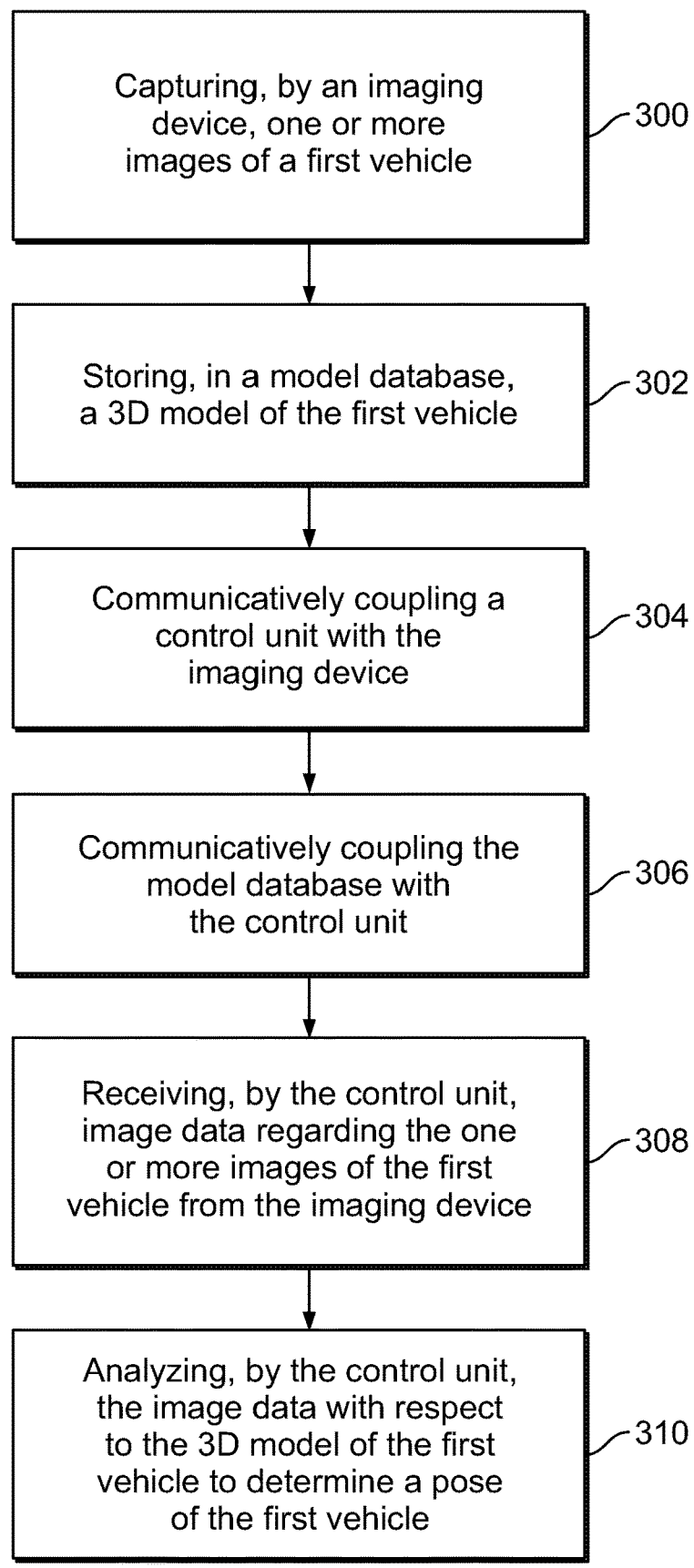
FIG. 4 illustrates a flow chart of a method for determining a pose of a first vehicle in relation to a second vehicle, according to an embodiment of the present disclosure.

FIG. 4 illustrates a flow chart of a method for determining a pose of a first vehicle in relation to a second vehicle, according to an embodiment of the present disclosure. The method includes capturing (300), by an imaging device, one or more images of a first vehicle; storing (302), in a model database, a three-dimensional (3D) model of the first vehicle; communicatively coupling (304) a control unit with the imaging device; communicatively coupling (306) the model database with the control unit; receiving (308), by the control unit, image data regarding the one or more images of the first vehicle from the imaging device; and analyzing (310), by the control unit, the image data with respect to the 3D model of the first vehicle to determine a pose of the first vehicle.

In at least one embodiment, the method also includes disposing the imaging device, the control unit, and the model database within a second vehicle.

In at least one example, the method also includes operating, by the control unit, one or more control devices of the second vehicle, based on the pose of the first vehicle.

In at least one embodiment, analyzing includes moving and manipulating, by the control unit, the 3D model of the first vehicle to match the image data of the first vehicle and determine the pose of the first vehicle.

In at least one embodiment, said analyzing includes dynamically generating, by a renderer of the control unit, an expected image as anticipated to be captured by the imaging device.

As an example, said analyzing includes employing, by the control unit, Maximum Mutual Information Correlator (MMIC) matching followed by a Fitts correlator.

As described herein, embodiments of the present disclosure provide systems and methods for automatically determining a pose of a first vehicle relative to a second vehicle. Further, embodiments of the present disclosure provide systems and method for automatically controlling positioning (including position/location and/or orientation) of a vehicle, such an aircraft during an in-flight refueling process. Further, embodiments of the present disclosure provide systems and methods for automatically maintaining a relative position between two different vehicles. Moreover, embodiments of the present disclosure provide systems and methods for low cost, effective, and efficient automatic vehicle pose determination and positioning.

Further, the disclosure comprises embodiments according to the following clauses:

Clause 1. A system comprising:

an imaging device configured to capture one or more images of a first vehicle;

a control unit in communication with the imaging device; and a model database in communication with the control unit, wherein the model database stores a three-dimensional (3D) model of the first vehicle, wherein the control unit is configured to receive image data regarding the one or more images of the first vehicle from the imaging device and analyze the image data with respect to the 3D model of the first vehicle to determine a pose of the first vehicle.

Clause 2. The system of Clause 1, further comprising a second vehicle, wherein the second vehicle comprises the imaging device, the control unit, and the model database.

Clause 3. The system of Clause 2, wherein the first vehicle is a first aircraft and the second vehicle is a second aircraft.

Clause 4. The system of Clause 3, wherein the second vehicle trails the first vehicle.

Clause 5. The system of Clause 3, wherein the first vehicle trails the second vehicle.

Clause 6. The system of any of Clauses 2-5, wherein the second vehicle further comprises one or more control devices in communication with the control unit, wherein the control unit is configured to operate the one or more control devices based on the pose of the first vehicle.

Clause 7. The system of any of Clauses 1-6, wherein the control unit is configured to move and manipulate the 3D model of the first vehicle to match the image data of the first vehicle and determine the pose of the first vehicle.

Clause 8. The system of any of Clauses 1-7, wherein the control unit comprises a renderer that dynamically generates an expected image as anticipated to be captured by the imaging device.

Clause 9. The system of any of Clauses 1-8, wherein the control unit is configured to employ Maximum Mutual Information Correlator (MIMIC) matching followed by a Fitts correlator.

Clause 10. A method comprising:

capturing, by an imaging device, one or more images of a first vehicle;

storing, in a model database, a three-dimensional (3D) model of the first vehicle;

communicatively coupling a control unit with the imaging device;

communicatively coupling the model database with the control unit;

receiving, by the control unit, image data regarding the one or more images of the first vehicle from the imaging device; and analyzing, by the control unit, the image data with respect to the 3D model of the first vehicle to determine a pose of the first vehicle.

Clause 11. The method of Clause 10, further comprising disposing the imaging device, the control unit, and the model database within a second vehicle.

Clause 12. The method of Clause 11, further comprising operating, by the control unit, one or more control devices of the second vehicle, based on the pose of the first vehicle.

Clause 13. The method of any of Clauses 10-12, wherein said analyzing comprises moving and manipulating, by the control unit, the 3D model of the first vehicle to match the image data of the first vehicle and determine the pose of the first vehicle.

Clause 14. The method of any of Clauses 10-13, wherein said analyzing comprises dynamically generating, by a renderer of the control unit, an expected image as anticipated to be captured by the imaging device.

Clause 15. The method of any of Clauses 10-14, wherein said analyzing comprises employing, by the control unit, Maximum Mutual Information Correlator (MIMIC) matching followed by a Fitts correlator.

Clause 16. A system comprising:

a first vehicle; and a second vehicle including:

an imaging device configured to capture one or more images of a first vehicle;

a control unit in communication with the imaging device;

a model database in communication with the control unit, wherein the model database stores a three-dimensional (3D) model of the first vehicle, wherein the control unit is configured to receive image data regarding the one or more images of the first vehicle from the imaging device and analyze the image data with respect to the 3D model of the first vehicle to determine a pose of the first vehicle; and one or more control devices in communication with the control unit, wherein the control unit is configured to operate the one or more control devices based on the pose of the first vehicle.

Clause 17. The system of Clause 16, wherein the first vehicle is a first aircraft and the second vehicle is a second aircraft.

Clause 18. The system of Clause 17, wherein the second vehicle trails the first vehicle.

Clause 19. The system of Clause 17, wherein the first vehicle trails the second vehicle.

Clause 20. The system of any of Clauses 16-19, wherein the control unit is configured to move and manipulate the 3D model of the first vehicle to match the image data of the first vehicle and determine the pose of the first vehicle, wherein the control unit comprises a renderer that dynamically generates an expected image as anticipated to be captured by the imaging device, and wherein the control unit is configured to employ Maximum Mutual Information Correlator (MIMIC) matching followed by a Fitts correlator.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:
an imaging device configured to capture one or more images of a first vehicle;
a control unit in communication with the imaging device, wherein the control unit comprises a renderer that dynamically generates an expected image as anticipated to be captured by the imaging device; and
a model database in communication with the control unit, wherein the model database stores a three-dimensional (3D) model of the first vehicle, wherein the control unit is configured to receive image data regarding the one or more images of the first vehicle from the imaging device and analyze the image data with respect to the 3D model of the first vehicle to determine a pose of the first vehicle,
wherein the renderer is configured to use an initial pose estimate to set a nominal pose, and generate a view of the 3D model of at least a portion of the first vehicle at multiple pose values bracketing the nominal pose.

2. The system of claim 1, further comprising a second vehicle, wherein the second vehicle comprises the imaging device, the control unit, and the model database.

3. The system of claim 2, wherein the first vehicle is a first aircraft and the second vehicle is a second aircraft.

4. The system of claim 3, wherein the second vehicle trails the first vehicle.

5. The system of claim 3, wherein the first vehicle trails the second vehicle.

6. The system of claim 2, wherein the second vehicle further comprises one or more control devices in communication with the control unit, and wherein the control unit is configured to operate the one or more control devices based on the pose of the first vehicle.

7. The system of claim 1, wherein the control unit is configured to move and manipulate the 3D model of the first vehicle to match the image data of the first vehicle and determine the pose of the first vehicle.

8. The system of claim 1, wherein the control unit is configured to employ Maximum Mutual Information Correlator (MMIC) matching followed by a Fitts correlator.

9. The system of claim 1, wherein the renderer is further configured to render the expected image from an arbitrary point of view, and arbitrary relative pose, and wherein the renderer is configured to generate a number of images, each corresponding to a particular relative pose, all of which are compared to the one or more images captured by the imaging device.

10. A method comprising:
capturing, by an imaging device, one or more images of a first vehicle;
storing, in a model database, a three-dimensional (3D) model of the first vehicle;
communicatively coupling a control unit with the imaging device;
communicatively coupling the model database with the control unit;
receiving, by the control unit, image data regarding the one or more images of the first vehicle from the imaging device; and
analyzing, by the control unit, the image data with respect to the 3D model of the first vehicle to determine a pose of the first vehicle, wherein said analyzing comprises dynamically generating, by a renderer of the control unit, an expected image as anticipated to be captured by the imaging device, said dynamically generating comprises using an initial pose estimate to set a nominal pose, and generating a view of the 3D model of at least a portion of the first vehicle at multiple pose values bracketing the nominal pose.

11. The method of claim 10, further comprising disposing the imaging device, the control unit, and the model database within a second vehicle.

12. The method of claim 11, further comprising operating, by the control unit, one or more control devices of the second vehicle, based on the pose of the first vehicle.

13. The method of claim 10, wherein said analyzing comprises moving and manipulating, by the control unit, the 3D model of the first vehicle to match the image data of the first vehicle and determine the pose of the first vehicle.

14. The method of claim 10, wherein said analyzing comprises employing, by the control unit, Maximum Mutual Information Correlator (MMIC) matching followed by a Fitts correlator.

15. A system comprising:
a first vehicle; and
a second vehicle including:
an imaging device configured to capture one or more images of a first vehicle;
a control unit in communication with the imaging device, wherein the control unit comprises a renderer that dynamically generates an expected image as anticipated to be captured by the imaging device;
a model database in communication with the control unit, wherein the model database stores a three-dimensional (3D) model of the first vehicle, wherein the control unit is configured to receive image data regarding the one or more images of the first vehicle from the imaging device and analyze the image data with respect to the 3D model of the first vehicle to determine a pose of the first vehicle, wherein the renderer is configured to use an initial pose estimate to set a nominal pose, and generate a view of the 3D model of at least a portion of the first vehicle at multiple pose values bracketing the nominal pose; and
one or more control devices in communication with the control unit, wherein the control unit is configured to operate the one or more control devices based on the pose of the first vehicle.

16. The system of claim 15, wherein the first vehicle is a first aircraft and the second vehicle is a second aircraft.

17. The system of claim 16, wherein the second vehicle trails the first vehicle.

18. The system of claim 16, wherein the first vehicle trails the second vehicle.

19. The system of claim 15, wherein the control unit is configured to move and manipulate the 3D model of the first vehicle to match the image data of the first vehicle and determine the pose of the first vehicle, and wherein the control unit is configured to employ Maximum Mutual Information Correlator (MIMIC) matching followed by a Fitts correlator.

20. The system of claim 15, wherein the renderer is further configured to render the expected image from an arbitrary point of view, and arbitrary relative pose, and wherein the renderer is configured to generate a number of images, each corresponding to a particular relative pose, all of which are compared to the one or more images captured by the imaging device.

* * * * *